United States Patent [19]

Neyer

[11] Patent Number: 4,509,180

[45] Date of Patent: Apr. 2, 1985

[54] METHOD AND AN APPARATUS FOR CORRECTING DISTORTION OF BINARY RECEIVED SIGNALS

[75] Inventor: Norbert Neyer, Zurich, Switzerland

[73] Assignee: LGZ Landis & Gyr Zug AG, Zug, Switzerland

[21] Appl. No.: 439,328

[22] Filed: Nov. 4, 1982

[30] Foreign Application Priority Data

Mar. 15, 1982 [CH] Switzerland ............... 1604/82

[51] Int. Cl.³ ........................... H03K 5/20
[52] U.S. Cl. ..................... 375/76; 307/358
[58] Field of Search .......... 375/76, 94; 328/162, 328/168; 307/358, 359

[56] References Cited

U.S. PATENT DOCUMENTS

| | | | |
|---|---|---|---|
| 4,056,738 | 11/1977 | Gustafson | 307/359 |
| 4,109,211 | 8/1978 | Mese et al. | 328/116 |
| 4,270,208 | 5/1981 | MacDavid | 375/75 |
| 4,318,128 | 3/1982 | Sauvanet | 375/75 |
| 4,370,748 | 1/1983 | Janc et al. | 375/94 |

Primary Examiner—Robert L. Griffin
Assistant Examiner—Stephen Chin
Attorney, Agent, or Firm—Ernest F. Marmorek

[57] ABSTRACT

In a method of correcting a signal having a sequence of binary bits modulated on a carrier and followed by demodulation of the signal, and wherein a distortion has been impressed on the signal during passage through a transmission channel, the steps include setting initial threshold values in dependence of initial reception conditions and wherein the threshold values normally vary as a function of time with a bit duration, comparing the demodulated signal several times within the bit duration with the set threshold values, and correcting the initially set threshold values in dependence of later reception conditions following the initial reception conditions.

8 Claims, 4 Drawing Figures

METHOD AND AN APPARATUS FOR CORRECTING DISTORTION OF BINARY RECEIVED SIGNALS

BACKGROUND OF THE INVENTION

Binary received signals are usually evaluated with the aid of a constant threshold value. If the received signal is equal to, or exceeds a threshold value, then the received value is a logical "1". If, however, the received signal is smaller than the threshhold value, then the received value is a logical "0". If the received signal is distorted in the transmission channel due to any interfering signals or any distortion, then this method leads to erroneous and inadmissible processing results. To avoid such erroneous results, the received signal must be corrected for any distortions.

From Mese et al, U.S. Pat. No. 4,109,211, there has become known a method for slow adaption to a threshold, in which the receiver is permitted to adapt to slow changes in the received signal over a long period of time, which changes occur by a slow change of the transmission conditions in the transmission channel.

REFERENCE TO OTHER APPLICATIONS

Reference is made to co-pending application entitled "An Apparatus for transmission of an impulse telegram at a high baud rate over the conductors of a low-voltage energy-distribution network" based on Swiss application No. 1603/82-0, and having priority of Mar. 15, 1982.

SUMMARY OF THE INVENTION

One of the principal objects of the invention is to remove any distortion from binary received signals so that ideal and substantially rectangular binary signals are available for further processing with a minimal probability of errors.

This object is attained in a method and an apparatus of correcting a signal having a sequence of binary bits modulated on a carrier, followed by demodulation of the signal, and wherein a distortion had been impressed on the signal during passage through a transmission channel, by steps comprising setting of initial threshold values in dependence of initial reception conditions, wherein the threshold values normally vary as a function of time within a bit duration, comparing the demodulated signal several times within the bit duration with the initially set threshold values, and correcting the initially set threshold values in dependence of later reception conditions following the initial reception conditions.

It is an advantage of this solution that by using known electronic blocks, but without employing any expensive filters, that the receiving portion of the receiver counteracts the non-ideal conditions in a transmission channel, and that any consequent distortion, without its causes being known in detail, can at least be partly removed, so that classical means of digital techniques can be utilized for further processing. The fact that any slow changes occurring in a transmission channel can be automatically recognized and taken into account is an advantage. It is a further advantage of this method that the circuit can be implemented both in an analog technique, as well as a digital technique. The method and the apparatus also prevents any noise occurring in the often very long pauses for being mistakenly taken as a valid telegram code, thus possibly triggering the processing of a received signal, and consequently blocking the transmission channel for a long time, which again has the consequence that any genuine telegram sent during this time cannot be processed.

Further objects and advantages of the invention will be set forth in part in the following specification, and in part will be obvious therefrom, without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings in which:

FIG. 3 waveform a is an output signal of a "1 channel" of the circuit for correcting distortion;

FIG. 3 waveform b is an output signal of the "0 channel" of the circuit for correcting distortion;

FIG. 3 waveform c is a sampled signal of the waveforms shown in a and b, sampled at discrete intervals, FIG. 3 waveform d is a timing diagram of a system clock signal;

FIG. 3 waveform e is a timing diagram of clock signal that is submultiple frequency of the signal of waveform d;

FIG. 3 waveform f is a timing diagram of a signal impulse sequence; and FIG. 3 waveform g is a timing diagram of an impulse have a leading edge identical with that of the impulse signal of FIG. 3 waveform f.

In all Figs. of the drawing, the same reference numerals denote equal parts. All elements denoted in the description with 74 . . . are those of Texas Instruments, Dallas, Tex., and all elements denoted with LF . . . denote those of National Semiconductor, Santa Clara, Calif.

DESCRIPTION OF THE PREFERRED EMBODIMENTS

Figure 1:
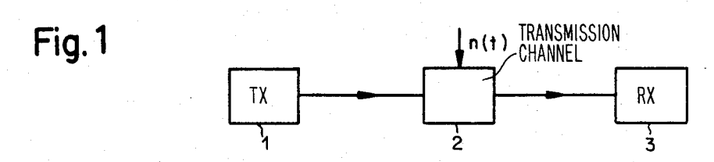
FIG. 1 is a block schematic diagram of a transmission channel.

Referring now to the drawing, and in particular to FIG. 1, the transmission system shown in FIG. 1 includes a transmitter 1, which is connected to a receiver 3 through a transmission channel 2. The transmission channel 2 consists, for example, of conductors of an alternating current energy distribution network, in which the transmission of information occurs primarily in a direction opposite to the direction of the flow of energy.

Figure 2:
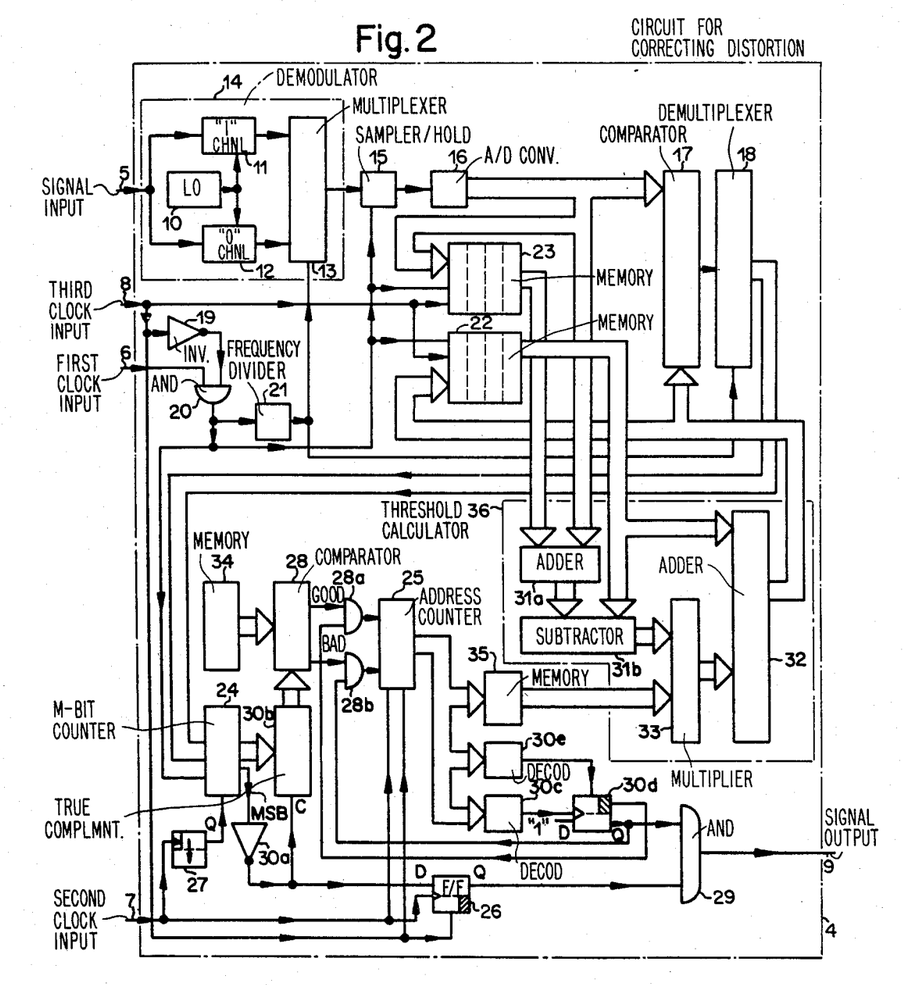
FIG. 2 is a block schematic diagram of a distortion correction circuit.

A circuit 4 for correcting distortion is shown in FIG. 2. The circuit 4 for correcting distortion includes a signal input 5, a first clock input 6, a second clock input 7, a third clock input 8, and a signal output 9. A local oscillator 10, a "1" channel 11, a "0" channel 12, and a multiplexer 13 together form a demodulator 14, for example a quadrature demodulator.

The following elements are connected directly by means of a single-wire connection:

the signal input 5 is connected to the signal input of the "1" channel 11, and to the signal input of the "0" channel 12, these inputs jointly forming the input of the demodulator 14;

the output of the local oscillator 10 is connected to the clock input of the "1" channel 11, and to the clock input of the "0" channel 12;

the output of the multiplexer 13, which is simultaneously the output of the demodulator 14, is connected to the signal input of the sampler/hold circuit 15;

the output of the "1" channel 11 is connected to a first input of the multiplexer 13, and the output of that "0" channel 12 is connected to a second input of the multiplexer 13;

the output of the sampler/hold circuit 15 is connected to the analog input of an analog-to-digital converter 16;

the output of a first comparator 17 is connected to the signal input of a demultiplexer 18;

the first clock input 6 is connected to a first input of a first AND gate 20, and the third clock input 8 is connected to the second input of the AND gate 20 through a first inverter 19;

the output of the first AND gate 20 is connected to the control input of the sampler/hold circuit 15, is additionally connected to the input of a frequency divider 21, and also to the respective clock inputs of a first memory 22, of a second memory 23, of an m-bit counter 24, and of an address counter 25;

the output of the frequency divider 21 is connected to the respective control inputs of the multiplexer 13, and of the demultiplexer 18;

the "1" channel output of the demultiplexer 18 is connected to the "up" input of the m-bit counter 24, and the "0" channel output of the demultiplexer 18 is connected to the "down" input of the m-bit counter 24;

the second clock input 7 is connected to the clock input of an address counter 25, and of a D-flip-flop 26, as well as to the control input of a monostable multivibrator 27;

the third clock input 8 is connected to the respective reset inputs of the D-flip flop 26, of the address counter 25, and of the first and second memories 22 and 23;

the Q output of the monostable multivibrator 27 is connected to the reset input of the m-bit counter 24;

the "good" output of the second comparator 28 is connected to the first input of the first release gate 28a, and the ouput of the first release gate 28a is connected to the "up" input of the address counter 25;

the "bad" output of the second comparator 28 is connected to a first input of a second release gate 28b, and the output of the second release gate 28b is connected to the "down" input of the address counter 25;

the Q output of the D-flip flop 26 is connected to the first input of a second AND gate 29, and the output of the second AND gate 29 is connected to the signal output 9;

the most significant bit (MSB) output of the m-bit counter 24 is connected to the D-input of the D-flip flop 26 through a second inverter 30a, and to the control input C of a true complement element 30b, which is, for example, of the type 74H 87;

the output of the first decoder 30c is connected to the clock input of a release-flip flop 30d, and the output of a second decoder 30e is connected to the reset input of the aforementioned flip-flop 30d;

the Q output of the release flip flop 30d is connected to the second input of the second AND gate 29, and of the second release gate 28b;

the $\overline{Q}$ output of the release flip flop 30d is connected to a second input of the first release gate 28a;

the logic value "1" appears on the D-input of the release flip flop 30d;

A direct bus connection exists between:

the k-bit digital output of the A/D converter 16, and the k-bit data input of the second memory 23, between the first k-bit input of the first comparator 17, and the first k-bit input of the first adder 31a;

between the k-bit output of the first memory 22, and a k-bit minus input of a subtractor 31d, and a first k-bit input of a second adder 32;

between the k-bit output of the second memory 23 and a second k-bit input of the first adder 31a;

between the k-bit output of the first subtractor 31a, and a first k bit plus input of the subtractor 31b;

between the k-bit output of the subtractor 31b, and the first k-bit input of a multiplier 33;

between the (m−1) lowest bit outputs of the m-counter 24, and the (m−1) bit input of the true/complement element 30b;

between the (m−1) bit output of the true/complement element 30b and a first (m−1) bit input of the second comparator 28;

between the (m−1) bit output of an (m−1) bit memory 34, and a second (m−1) bit input of the second comparator 28;

between the h-bit output of the address counter 25, and the h-bit address input of a read only memory 35, as well as between the h-bit inputs of the first and of the second decoders 30c and 30e;

between the k-bit output of the read only memory 35 and the second k-bit input of the multiplier 33;

between the k-bit output of the multiplier 33, and the second k-bit input of the second adder 32; and between the k-bit output of the second adder 32, and the k-bit data input of the first memory 22, and of a second k-bit input of a first comparator 17;

The first and the second adders 31a and 32, the subtractor 31b, and the multiplier 33 form together a threshhold calculator 36.

The first comparator 17 is a digital comparator, and the first memory 22 and the second memory 23 is each a digital memory having k-bits per cell. Both memories 22 and 23 have 2M cells and consist, for example, each of a shift register having k 2M cells, the clock input and reset inputs of the shift registers being connected to one another.

OPERATION

The impulse sequence which is transmitted consists, in the sequence indicated, of an initial or preliminary bit pattern, of a start byte, which, for example, consists of eight bits "10010001", and of the telegram containing the actual information, which, for example, always starts with a "0" bit. The initial or preliminary sequence contains, for example, 12 "1" bits and 12 "0" bits, alternating with one another.

Even when an ideal rectangular transmit signal is assumed to exist at the input of the transmit modulator, the output signal of the demodulator in the receiver, due to the non-ideal properties of the transmission channel 2, will, as a rule, be severely distorted. For this reason an adaptive threshold matching is needed to be used in the receiver, in which the threshold values during each bit duration $T_2$ are time-variable, and therefore form threshhold value functions.

The formation of these threshold value functions takes place during impulse sequences which have the same number of alternating logic bit values "1" and "0", namely it takes place both in the initial sequence continuously, and during the rest of the impulse sequence, at each edge of the bits. The time limits of these sequences need not coincide under all circumstances with the leading and trailing edges of each bit.

The determination or calculation of the threshold values is accomplished with the aid of a threshold value calculator 36 primarily during the initial sequence, and the adaptation is preferably concluded, more or less at the latest, towards the end of the start byte. At the start of the initial or preliminary sequence, the threshold values to be determined or calculated are very low, but they improve during the course of the initial or preliminary sequence, and should, as a rule, assume during that sequence their definitive matched or adapted value. Subsequently, only fine adaptation takes place when a bit change occurs.

The received signal is, for example, "Chirp" frequency modulated, and is demodulated in the demodulator 14 of the distortion correction circuit 14 (see FIG. 2). This demodulator, is for example, a known quadrature demodulator, and, as it is not an object of the claims, is described here only very briefly. The local oscillator 10 supplies a common auxiliary signal for the "1" channel 11, and for the "0" channel 12, the auxiliary signal serving in both channels for the generation of the "Chirp" reference signals.

In each of the two channels the possibly conditioned received signal, which appears on the signal output 5 of the distortion correction circuit, is each multiplied with two "Chirp" reference signals phase shifted with respect to one another by 90 degrees, and the results of these multiplications are subsequently filtered. The two so-obtained analog values $\alpha_i$ and $\beta_i$ obtained for each channel, wherein i=0 for the "0" channel 12, and i=1 for the "1" channel 11, are related to one another by the mathematical formula $$A_i = \sqrt{\alpha_i^2 + \beta_i^2}$$

Figure 3:
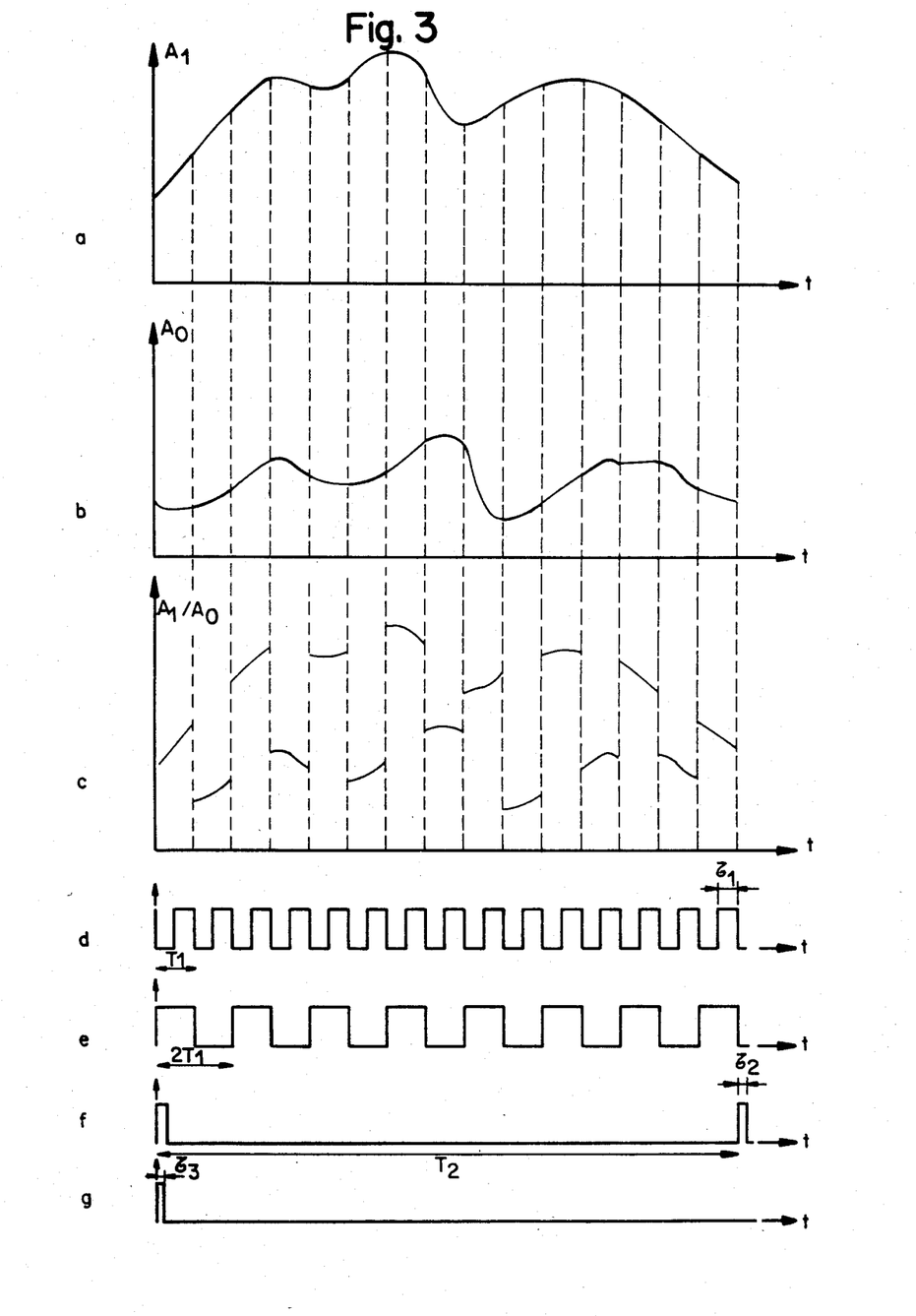

If a "1" bit has been received, then $A_1 >> A_o$ The reverse applies when a bit "0" is received. In each case $A_1$ and $A_o$ will, as a rule, have values different from zero. In FIG. 3a there is shown the output signal of the "1" channel 11, and in FIG. 3b there is shown the output signal of the "0" channel 12.

The multiplexer 13 samples the analog values $A_1$ and $A_o$ in alternating time sequence with the aid of a multiplexed clock signal supplied by the frequency divider 21, and shown in FIG. 3e, these values then appearing at the output of the multiplexer 13.

The so obtained output signal is shown in FIG. 3c, and consists, during the bit duration $T_2$ of 2M sampled values, namely of M sampled values per channel. M is, for example, equal to 20. These sampled values are denoted by $A_{i,j}$ per channel, where j assumes the values 1, 2, ... m.

All clock signals are synchronized with the net zero crossings. The generation of the clock signals synchronous with one another is accomplished by known methods of the digital technique, and is therefore not further described in detail, nor shown in FIG. 2, since it does not form an object of the claims.

The third clock signal appearing at the clock input 8 is shown in FIG. 3g, and consists of a short impulse having a duration $\tau_3$, which commences at the start of a sequence, and resets both memories 22 and 23, as well as the D-flip flop 26, and the address counter 25 to zero at the beginning of the impulse sequence. The system clock signal appearing on the first clock input 6 and shown in FIG. 3d reaches through the first AND gate 20 the input of the frequency divider 21, where its frequency is divided by a factor of 2 with the aid of its negative edge, and also reaches the control input of the sampler-hold circuit 15, as well as the clock inputs of the m-bit counters 24, and of the two memories 22 and 23. The period of the system clock signal is equal to $T_1$, its impulse period is equal to $T_1$ and its first impulse gap commences near the start of the sequence. With the aid of the system clock signal, the sampler/hold circuit 15, which is, for example, of the type LF398, samples once per multiplexed scanning, for example in the center, the sampled values $A_{i,j}$ at the output of the demodulator 14 during the impulse duration $T_1$, and subsequently maintains the sampled values during the impulse gap so that they can be converted into k-bit digital values in the analog-to-digital converter 16 postcoupled to the sampler-hold circuit 15, and wherein the analog-to-digital converter may be, for example, of the type ADC80 of Analog Devices, Norwood, Mass. At the output of the analog-to-digital converter 16 therefore there appear 2M digital values per bit duration $T_2$.

The first AND gate 20 serves only to delay the first impulse of the system clock signal with the aid of the first inverter 19 by the value $\tau_3$, so as to permit the rectangular third clock signal, which appears on the third clock output 8, to reset the D-flip flop 26 and both memories 22 and 23 to zero at the start of the impulse sequence. The third clock signal releases the AND gate 20 for the system clock signal through the inverter 19 only following the end of the impulse duration $\tau_3$, the third clock signal assuming then the value of "zero" for the remainder of the reception, so that the remainder of the third clock signal, namely the first clock impulse shortened by the value $\tau_3$, and all subsequent impulses, may reach the output of the AND gate 20. A condition for correct operation is that $\tau_1 \leq \tau_3$.

The bit clock signal appearing on the second clock input 7 is shown in FIG. 3f and has a period $T_2$ equal to the bit-duration, and an impulse duration $\tau_2 \leq \tau_3$.

Since 2M scans or samples take place per bit duration $T_2$, $T_2 = 2MT_1$.

The frequency divider 21 is, for example, a D-flip flop of the type 74 LS 74, to the clock input of which there is connected an additional (non-illustrated) inverter. The first impulse of the frequency divider 21, as well as that of the bit clock signal commences the start of a sequence.

The two memories 22 and 23 contain, as has already been mentioned, 2M k bit cells, and operate each as a shift register. Each, for example, is implemented by means of several shift registers of the type 74LS164. The stored values of the two memories 22 and 23, operated in parallel, are shifted with the aid of the system clock signal, as shown in FIG. 2, from left to right, and from cell to cell; these shifted values are the 2M alternating threshold values occurring during each bit duration in the channels 11 and 12, determined or calculated by a threshold calculator 36, and stored in the first memory 22, and also the 2M, also alternating values of the currently sampled bits, which are supplied by the analog-to digital converter 16, and stored in the second memory 23. In the case of the second bit there are stored in the second memory 23 the 2M sampled values, and in the first memory 22 there are stored the 2M threshold values of the preceeding bit. If the bits of the impulse sequence are consecutively numbered, then, as shown in FIG. 2, the right cell of the second memory 23 contains the sampled values $A_{i,j,m-1}$, and the right cell of the first memory 22 contains the sampled threshold values $S_{i,j,m-1}$ of the $(m-1)^{th}$ bit, if the sampled values $A_{i,j,m}$ of the current $(m-1)^{th}$ bit appear at the output of the analog-to-digital converter 16.

The first comparator 17, which is, for example, of the type 74LS85, compares successively in time the sampled values $A_{i,j,m}$ with the associated threshold values $S_{i,j,m}$ which are supplied by the threshold calculator 36. When a positive decision is made, namely when $A_{i,j,m} \geq S_{i,j,m}$, then at the output of the comparator 17 a logic value "1" occurs. The demultiplexer 18, postcoupled to the comparator 17, which operates synchronously with the multiplexer 13, separates the positive decision values of both channels 11 and 12 from one another, and supplies the values of the "1" channel 11 to the "1" channel output of the demultiplexer 18, and those of the "0" channel 12 to the "0" channel output. For each positive decision within a bit of the "1" channel, the contents of the m-bit counter 24, which operates as a forward/backwards counter, are increased by 1, and for each positive decision of the "0" channel, the contents of the m-bit counter 24 are reduced by 1, so that at the end of each bit in the m-bit counter an associated difference $G=(N_1-N_o)$ is stored. $N_1$ is here the number of positive decisions of the "1" channel, and $N_o$ is the corresponding number of decisions of the "0" channel.

During reception of a "1" bit, all decisions of the "1" channel are theoretically positive, and those of the "0" channel are negative. During reception of a "0" bit, theoretically the reverse applies. Due to the presence of distortion, these decisions could, however, be reversed and falsified for some sampled values.

The decision relating to the logic value of a received bit is made based on the number of positive tests obtained from each channel. This statistical procedure has the advantage that most questionable bits are correctly decoded, as severe disturbances or spikes perturb only a few sampled values. However, the number of sampled values per bit may not be too small, namely it should be chosen to have an order of magnitude of at least 18.

With great probability, during reception of a bit "1", $N_1$ is greater than $N_o$, and during reception of a bit "0" $N_o$ is greater than $N_1$, namely more than half of the 2M sampling operations are decided in favor of either one bit or of the other bit, and the sign or the most significant bit (MSB) of the difference $G=(N_1-N_o)$ permits recognition at a high probability which logic value the procesed bit possesses. In the case of a bit "1", the MSB is equal to "0", and in the case of a bit "0" the MSB is equal to "1". This value of the MSB is inverted with the aid of the second inverter 30, and read-in at the beginning of the next bit into the D-flip flop 26. The bit in first pulse sequence therefore reaches one bit delayed the signal output 9 of the distortion correction circuit 4 at the rythm of the bit clock signal, if the second AND gate 29 is released. G denotes the quality of the bit reception, and provides information regarding the quality of the bit detection. The negative edge of the bit clock signal subsequently resets the m-bit counter 24 to zero with the aid of the monostable multivibrator 27.

In FIG. 2 it has not been taken into account that, for practical reasons, as a rule, the first sampled values of each channel are not processed. When $M=20$, there therefore remain still 36 sampled values $A_{i,j}$ for evaluation. The quality/factor G then has a value between $-18$ and $+18$.

If the value of $G=(N_1-N_o)\geq 0$, then its $(m-1)$ lowest bits are supplied through the true/complement element 30b to the first $(m-1)$ bit input of the second comparator 28, which may, for example, also be of the type 74LS85. If, however, $G<0$, then these $(m-1)$ bits are first complemented in the true/complement element 30b, and only then fed to the first $(m-1)$ bit input of the second comparator 28.

The second comparator 28 compares continuously the absolute value of the $(m-1)$ lowest output bits of the m-bit counter 24 with a positive digital reference value G stored in the $(m-1)$ bit memory 34. This $(m-1)$ bit memory is programmable and consists, for example, of dual in line switches, on whose $(m-1)$ contacts certain logic values appear. If, during a bit duration, $T_2$ reaches the value $G_Q$ or exceeds that valve, then there appears on a "good" output of the second comparator 28, and therefore also, when the first release gate 28a is not inhibited, on the "up" input of the address counter 25, a logic value "1". If the value $G_Q$ is not reached, however, then a "bad" output of the second comparator 28, when the second release gate 28b is not inhibited, passes a logic value "1" to the "down" input of the address counter 25. The address counter 25 counts with the aid of the bit clock signal the difference between the number of counts either exceeding or falling below the value $G_Q$ for successive bits of the bit sequence.

Four regions exist:
(1) $18 \geq G \geq G_Q$: A "1" bit has been received, and its detection quality is good.
(2) $G_Q > G \geq 0$: A "1" bit has been received, but its detection quality is poor.
(3) $0 > G > -G_Q$: A "0" bit has been received, but its detection quality is bad
(4) $-G_Q \geq G \geq -18$: A "1" bit has been received, and the quality of its detection is good.

In other words; the bit quality is good, when the absolute value of G is greater or equal to $G_Q$.

The aforedescribed quality can be bad, either because the received bit has been severely distorted, or because the threshhold values $S_{i,j,m}$, have not yet been sufficiently adapted to the transmission conditions.

The output of the address counter 25 feeds the respective inputs of both decoders 30c and 30e, as well as the address inputs of the permanent value memory 35, which is, for example of the type 7488 and in which, at an increasing address, and in the sequence indicated the following h-bit digital values of a weighting constant k are stored: $\frac{1}{2}, \frac{1}{4}, \frac{1}{4}, \frac{1}{4}, \frac{1}{4}, \frac{1}{8}, \frac{1}{8}, \frac{1}{8}$, and $\frac{1}{8}$. Both counters 24 and 25 are, for example, of the type 74LS 191. If the count value of the address counter 25 reaches the value of eight, then there appears on the output of the first decoder 30c, and therefore also on the Q output of the release flip flop 30d, a logic value "1". Its $\overline{Q}$ output then inhibits, with the aid of the release gate 28a, the forward count of the address counter 25. If the address counter 25, however, reaches the value of zero, then a logic value "1" is generated at the output of the second decoder 30e, which resets the release flip flop 30d to zero. This time its Q-output inhibits, with the aid of the second release gate 28b, the backward counting of the address counter 25. The set Q-output of the release flip flop 30d releases the second AND gate 29 for the bit sequence, and serves as a "carrier present" signal. The first decoder 30c is an AND gate having h inputs, and the second decoder 30e is a NOR gate with an equal number of inputs. Both release gates 28a and 28b are implemented by means of several NAND Gates of the type 74LS00, NOR gates of the type 74LS 02, and inverters of the type 74LS04.

Each time when the border regions $G_Q$ have been reached or exceeded during a bit, the address of the permanent value memory 35 is increased by one, and a lower or equal value of K is supplied to the threshold calculator 36. Otherwise this address is reduced by one, and an equal or higher value of K is supplied to the threshold calculator 36.

Figure 4:
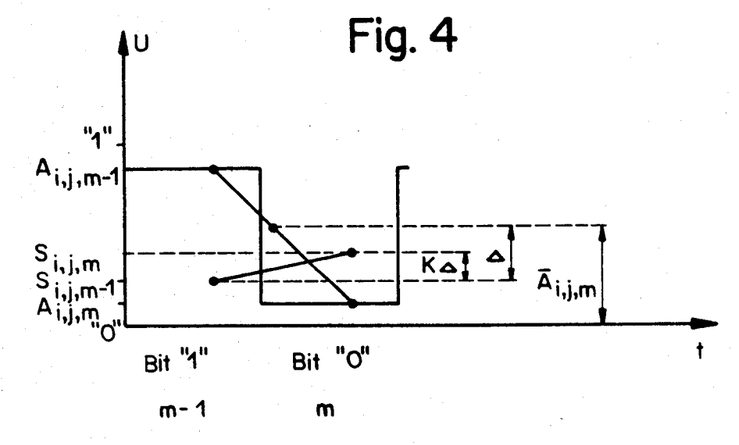

The threshold values $S_{ij, m}$ are determined with the aid of the threshold calculator as follows: (see also FIG. 4):

$$S_{i,j,m} = S_{i,j,m-1} + K \cdot \Delta, \text{where} \quad (1)$$

$$\Delta = \overline{A}_{i,j,m} - S_{i,j,m-1} \quad (2)$$

where $A_{i, j, m}$ is an average value of equal sampled values $A_{i, j}$ of two successive bits
$\overline{A}_{i,j,m}$ is, for example the arithmetic average value of $$(A_{i,j,m-1} + A_{i,j,m})/2$$

$\overline{A}_{i, j, m}$ is an average value of the sampled values $A_{i, j, m-1}$ of the old or previously sampled values $A_{i, j, m}$ stored in the second memory 3, and of the associated new sampled values $A_{i, j, m}$ supplied by the analog-to digital converter 16.

Equation (1) yields, when the value of $\Delta$ is substituted from equation (2):

$$S_{i,j,m} = S_{i,j,m-1} + K(\overline{A}_{i,j,m} - S_{i,j,m-1})$$

$$= S_{i,j,m-1}(1 - K) + K\overline{A}_{i,j,m}.$$

The significance of the parameters in the above equation can be ascertained from the graphical representation of FIG. 4 for the case of a sampled value of a first bit "1", and the same-numbered value of a succeeding bit "0". The first adder 31a forms an average value $\overline{A}_i$, $(-A_{i, j, m-1}+A_{i, j, m})/2$. Division by a factor of 2 is obtained by means of the output connection of the first adder 31a, as division by a binary number by 2 provides the same value, except that it is shifted by one bit to the right. The subtractor 31b calculates the value $\Delta = \overline{A}_{i,j,m} - S_{i,j,m-1}$, and a multiplier determines the new threshold value $S_{i,j,m} = S_{i,j,m-1} + K \cdot \Delta$. The subtractor 31b is implemented in a known manner, for example by means of a four/complement element of the type 74H87 and an adder of the type 74LS87. All AND gates used are, for example, of the type 74LS08, all inverters, for example, of the type 74LS04, all D-flip flops, for example, of the type 74LS74, and both adders 31a and 32, for example, of the type 74LS83. The monostable multivibrator is, for example, of the type 74121. The demultiplexer 18 consists, for example, of several demultiplexers of the type 74LS154.

Since the values of K are always smaller than 1, according to equation (1), only a partial value of $\Delta$ is added to the old threshold value $S_{i, j, m-1}$, so as to obtain the new threshold value of $S_{i, j, m}$. The constant K is a weighting factor and has, at the beginning of the initial of preliminary sequence, the relatively high value of $\frac{1}{2}$. It determines how quickly the threshold value is changed, namely how quickly it is adapted to the conditions prevailing on the transmission channel 2. With its aid the threshold adaptation is accelerated, or slowed down, depending on whether the transmission conditions are good or bad.

During the initial sequence the threshold values calculated change continuously, starting with a relatively poor adaptation, according to the value $K=\frac{1}{2}$.

During the initial or preliminary sequence the adaptation of the threshold values $S_{i, j, m}$ improves whenever $/G/\geq G_Q$, namely when G is within the region one to four, in which case K assumes the successive values $\frac{1}{4}$, $\frac{1}{4}$, $\frac{1}{4}$, $\frac{1}{4}$, $\frac{1}{8}$, $\frac{1}{8}$, $\frac{1}{8}$, $\frac{1}{8}$. At the latest, following termination of the start byte, as a rule, however, already during the initial sequence, the final adapted threshold values are reached. This is the case when K has reached the value of $\frac{1}{8}$ for the fourth time; at this moment in time the signal "carrier present" is generated, which releases the second AND gate 29, so that passage for the telegram is prepared. If the detection worsens during the passage of time, namely if G is within the region 2 to 3, then the aforedescribed sequence takes place in the reverse direction.

By a special selection of the values K-four times the value $\frac{1}{4}$, and four times the value $\frac{1}{8}$,—a time-dependent filter function, for example a filter of the first order, is included in the threshold adaptation, so that any sudden short-time disturbances hardly influence the threshold adaptation, and thus do not unnecessarily shift the threshold values $S_{i, j, m}$. The input signals of this filter are the average values, and its output signal the threshold-value function. The threshold adaptation, based on large values of K, is accomplished very quickly at the commencement of the transmission, namely its time constant is then very small, as the quality of reception then is only very poor, and is then slowed down in view of a relatively larger time constant during the course of the impulse sequence.

The signal output 9 of the distortion correction circuit 4 feeds a further (non-illustrated) decoder, which decodes the impulse sequence released by the second AND gate 29 in a known manner. If the start byte has been correctly received and decoded, this decoder releases a further (non-illustrated) AND gate post-coupled to the decoder at the end of the start byte for any succeeding and possibly decoded telegram.

If the bit quality is worsened during reception of the telegram, then the "hysteresis" of the K values prevents the telegram from being directly broken off or interrupted. Only when the K-value has again reached a value of $\frac{1}{2}$, namely when the address counter 25 assumes the value of zero, then passage of the telegram is inhibited with the aid of the second decoder 30e, and of the release flip flop 30d, and the "carrier present" signal is again reset to "0".

A microcomputer is preferably used for implementing the threshold calculator 36.

The abovedescribed function is valid based on assuming serially operated electronic circuits. However, this function can also be implemented with the aid of electronic circuits operated in parallel. Such a solution is, however, as a rule, more expensive.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. An apparatus for correcting a signal for distortion by means of threshold value comparisons, said signal having a sequence of binary "1" and "0" bits modulated on a carrier, and wherein the distortion has been impressed on said signal during passage through a transmission channel, comprising in combination signal demodulation means for demodulating the signal, sampling means for sampling the demodulated "1" and "0" bits each an equal number of times during a bit duration, including hold means for holding the sampled signal substantially at the sampled value, and wherein the sampled "0" bits form initial threshold values, and the sampled "1" bits form demodulated signal values, analog-to-digital converter means postcoupled to said sampling means for quantizing the sampled values, a first memory for storing the quantized initial threshold values, a second memory for storing the quantized demodulated values, a threshold calculator for calculating from the stored and quantized demodulated signal values and from the stored and quantized initial threshold values revised threshold values, a first comparator for comparing the quantized demodulated signal values with corresponding of said revised threshold values, and for deciding whether the sampled signal value is a "1" value or a "0" value, quality factor determining means for determining the quality factor of a detected bit including storage means for storing a reference quality factor, a second comparator connected to said storage means for arriving at a decision whether said quality factor of a detected bit exceeds or falls below said reference quality factor in dependence of the output of said first comparator, and of said storage means, read only memory means having address locations with variable contents, and means for changing the contents of said address locations in dependent of the decision of said second comparator, and for feeding a series of parameters to said treshold calculator in dependence of the changed contents of said address locations.

2. An apparatus as claimed in claim 1, wherein said quality factor determining means further comprise a demultiplexer for separating the output of said comparator into separate "1" and "0" sampled values, a second counter for counting the difference between said "1" and "0" sampled values within each "1" bit, and within each "0" bit, respectively, and for feeding the count obtained to said second comparator.

3. An apparatus as claimed in claim 1, wherein said means for changing the contents of said address locations includes an address counter for accepting the output of said second comparator, and for counting the difference of the number of sampled values within each bit exceeding or falling below said reference quality factor, and wherein the contents of said address locations are changed in further dependence on the output of said address counter.

4. In a method of correcting a signal having a sequence of binary bits modulated on a carrier and followed by demodulation of said signal, so as to obtain a "1" channel and a "0" channel, and wherein a distortion has been impressed on said signal during passage through a transmission channel, the steps comprising setting initial threshold values in dependence of initial reception conditions, said threshold values normally varying as a function of time within a bit duration, selecting said threshold values within said bit duration so as to be a sequence of a predetermined number of discrete integer sampled threshold values $S_{i,j,m}$, sampling the demodulated signal so as to obtain a prearranged number of discrete sampled values of the demodulated signal $A_{i,j,m}$, equal to said predetermined number, said sampled threshold values being determined as a function of the relation:

$$S_{i,j,m} = S_{i,j,m-1}(1 - K) + K\overline{A}_{i,j,m}$$

wherein $S_{i,j,m-1}$ is a chosen discrete sampled threshold value of a bit preceding a corresponding chosen discrete sampled threshold value of a selected bit, K is a weighting constant stored in a permanent value memory, and $\overline{A}$ is an average value obtained from the values $A_{i,j,m}$ and $A_{i,j,m-1}$ being a chosen discrete sampled value of the bit of the demodulated signal preceding a corresponding chosen discrete sampled value of a selected bit of the demodulated signal, comparing the discrete sampled values $A_{i,j,m}$ of the demodulated signal several times within said bit duration with the selected threshold values $S_{i,j,m}$, and assigning to a received bit a logical "1" value when a majority of the discrete sampled values of the demodulated signal $A_{i,j,m}$ within said received bit have a value exceeding the corresponding discrete sampled threshold values $S_{i,j,m}$ in said "1" channel, and assigning to a received bit a logical "0" value when a majority of said discrete sampled threshold values $S_{i,j,m}$ within said received bit have a value exceeding the corresponding discrete sampled values of the demodulated signal $A_{i,j,m}$ in said "0" channel, and thereafter correcting the initially selected threshold values in dependence of later reception conditions following said initial reception conditions.

5. In a method of correcting a signal having a sequence of binary bits modulated on a carrier and followed by demodulation of said signal, and wherein a distortion has been impressed on said signal during passage through a transmission channel, the steps comprising setting initial threshold values in dependence of initial reception conditions, said threshold values normally varying as a function of time within a bit duration, comparing the demodulated signal several times within said bit duration with the initially set of threshold values, selecting a quality factor (G) for each bit of said bit sequence, comparing the absolute value of said quality factor with a positive reference quality factor ($G_Q$), and correcting the initially set of threshold values in dependence of later reception conditions following said initial reception conditions.

6. The method as claimed in claim 5, further comprising the steps of increasing the address of a read only memory by one upon said quality factor (G) exceeding the absolute value of said reference quality factor ($G_Q$), of decreasing said address by one upon said quality factor (G) falling below said absolute value of said reference quality factor ($G_Q$), and storing in said read only memory falling or equal values of a weighting constant (K) upon said address being increased.

7. In a method of correcting a signal having a sequence of binary bits modulated on a carrier and followed by demodulation of said signal, so as to obtain a "1" channel and a "0" channel, and wherein a distortion has been impressed on said signal during passage through a transmission channel, the steps comprising setting initial threshold values in dependence of initial reception conditions, said threshold values normally varying as a function of time within a bit duration, selecting said threshold values within said bit duration so as to be a sequence of a predetermined number of discrete integer samples threshold values $S_{i,j,m}$, sampling the demodulated signal so as to obtain a prearranged number of discrete samples values of the demodulated signal $A_{i,j,m}$, equal to said predetermined number, said sampled threshold values being determined as a function of a chosen discrete sampled threshold value $S_{i,j,m-1}$ of a bit preceding a corresponding chosen discrete sampled threshold value of a selected bit, of a weighting constant K stored in a read only memory, and of an average value $A_{i,j,m}$ obtained from the values $A_{i,j,m}$ and $A_{i,j,m-1}$, being a chosen discrete sampled value of the bit of the demodulated signal preceding a corresponding chosen discrete sampled value of a selected bit of the demodulated signal, comparing the discrete sampled values $A_{i,j,m}$ of the demodulated signal several times within said bit duration with the corresponding selected threshold values $S_{i,j,m}$, assigning to the comparison a positive decision result when the discrete sampled values $A_{i,j,m}$ of the demodulated signal within said received bit is equal to or exceeds the corresponding discrete sampled threshold values $S_{i,j,m}$, assigning to a received bit a logical "1" value when the number ($N_1$) of positive decisions of the "1" channel is greater than the number ($N_0$) of positive decisions of the "0" channel, assigning to a received bit a logical "0" value when the number ($N_0$) of positive decisions of the "0" channel is greater than the number ($N_1$) of positive decisions of the "1" channel, and correcting the initially selected threshold values in dependence of later reception conditions following said initial reception conditions.

8. In a method of correcting a signal having a sequence of binary bits modulated on a carrier and followed by demodulation of said signal, so as to obtain a "1" channel and a "0" channel, and wherein a distortion has been impressed on said signal during passage through a transmission channel, the steps comprising setting initial threshold values in dependence of initial reception conditions, said threshold values normally varying as a function of time within a bit duration, selecting said threshold values within said bit duration so as to be a sequence of a predetermined number of discrete integer sampled threshold values $S_{i,j,m}$, sampling the demodulated signal so as to obtain a prearranged number of discrete sampled values of the demodulated signal $A_{i,j,m}$, equal to said predetermined number, said sampled threshold values being determined as a function of the relation:

$$S_{i,j,m} = S_{i,j,m-1}(1 - K) + K\overline{A}_{i,j,m},$$

wherein $S_{i,j,m-1}$ is a chosen discrete sampled threshold value of a bit preceding a corresponding chosen discrete sampled threshold value of a selected bit, K is a weighting constant stored in a read only memory, and $\overline{A}_{i,j,m}$ is an average value obtained from the values $A_{i,j,m}$ and $A_{i,j,m-1}$, $A_{i,j,m-1}$ being a chosen discrete sampled value of the bit of the demodulated signal preceding a corresponding chosen discrete sampled value of a selected bit of the demodulated signal, comparing the discrete sampled values $A_{i,j,m}$ of the demodulated signal several times within said bit duration with the corresponding selected threshold values $S_{i,j,m}$, assigning to the comparison a positive decision result when the discrete sampled values $A_{i,j,m}$ of the demodulated signal within said received bit is equal to or exceeds the corresponding discrete sampled threshold values $S_{i,j,m}$, assigning to a received bit a logical "1" value when the number ($N_1$) of positive decisions of the "1" channel is greater than the number ($N_0$) of positive decisions of the "0" channel, assigning to a received bit a logical "0" value when the number ($N_0$) of positive decisions of the "0" channel is greater than the number ($N_1$) of positive decisions of the "1" channel, and correcting the initially selected threshold values in dependence of later reception conditions following said initial reception conditions.

* * * * *